US008696455B2

(12) United States Patent
Domville et al.

(10) Patent No.: US 8,696,455 B2
(45) Date of Patent: Apr. 15, 2014

(54) COMMUNICATION METHODS AND APPARATUS FOR ONLINE GAMES

(75) Inventors: Ian Domville, Wallingford (GB); Henry Rawlinson, Maidenhead (GB)

(73) Assignee: Rockstar Bidco, LP, New York, NY (US)

( * ) Notice: Subject to any disclaimer, the term of this patent is extended or adjusted under 35 U.S.C. 154(b) by 1045 days.

(21) Appl. No.: 11/537,040

(22) Filed: Sep. 29, 2006

(65) Prior Publication Data

US 2008/0081697 A1    Apr. 3, 2008

(51) Int. Cl.
*A63F 13/00*   (2006.01)
(52) U.S. Cl.
USPC .............................................. 463/35; 463/34
(58) Field of Classification Search
USPC ......................................... 463/35; 455/414.4
See application file for complete search history.

(56) References Cited

U.S. PATENT DOCUMENTS

| 6,731,307 | B1 * | 5/2004 | Strubbe et al. | 715/727 |
|---|---|---|---|---|
| 7,139,031 | B1 * | 11/2006 | Bray | 348/468 |
| 7,437,290 | B2 * | 10/2008 | Danieli | 704/251 |
| 2003/0013508 | A1 * | 1/2003 | Sato | 463/8 |
| 2003/0115063 | A1 * | 6/2003 | Okunoki | 704/266 |
| 2004/0049390 | A1 * | 3/2004 | Brittan et al. | 704/270.1 |
| 2004/0138889 | A1 * | 7/2004 | Gilboy et al. | 704/270 |
| 2005/0278179 | A1 * | 12/2005 | Overend et al. | 704/270.1 |
| 2006/0227761 | A1 * | 10/2006 | Scott et al. | 370/352 |
| 2008/0057925 | A1 * | 3/2008 | Ansari | 455/414.4 |

* cited by examiner

*Primary Examiner* — Paul A D'Agostino
*Assistant Examiner* — Ankit Doshi
(74) *Attorney, Agent, or Firm* — Barnes & Thornburg LLP

(57) ABSTRACT

By providing voice recognition in a gaming environment, an IVR server may operate to revoice a player with a voice tone pitch and accent more appropriate to the player's character. This improves the quality of the illusion of the game play. Furthermore, accurate volume may be applied to particular voices dependent on their location relative to the player and the game may be controlled using voice commands.

10 Claims, 2 Drawing Sheets

COMMUNICATION METHODS AND APPARATUS FOR ONLINE GAMES

FIELD OF THE INVENTION

The present invention relates to online gaming and in particular, but not exclusively, to the provision of IVR (Interactive Voice Response) enhancement of multiplayer on-line role-playing games.

BACKGROUND OF THE INVENTION

Multiplayer online role-playing games enable large numbers of players to participate in a single game. Some of the more popular games include World of Warcraft, Everquest II, Runescape and Star Wars Galaxies.

A key element of these games is that players can role-play a character that is very different to their real self. For example, a character may be a different age, sex or race. Fantasy role-playing games often allow players to play, as non-human characters such as a dwarf or an elf. In both cases, players typically appear to each other in the game as the characters they are playing.

Within the context of the games, players routinely interact with each other. Players can cooperate and/or compete with each other to achieve their aims. In many cases, cooperation between several players is essential in order for certain objectives to be achieved and competition between teams of players is not uncommon.

Communication between players is typically achieved using text-based communications such as chat or private messages. Many games apply profanity filters to these messages, but it is relatively easy for players to bypass them with creative spellings or by using non-alphabetic characters to construct letters.

Players can also interact with computer controlled non-player characters in which dialogue between a player and a non-player character will be a textual interaction; with the player selecting from a range of possible responses at each stage of the dialogue.

In addition, some groups of players use 3rd party voice conferencing services to coordinate their activities when operating as a team.

However, if a player is very different to the character they are role-playing, for example, a different sex, this direct voice communication inevitably detracts from the illusion that a player wishes to project.

SUMMARY OF THE INVENTION

The present invention allows players to establish voice communications with an IVR system, which performs real-time voice recognition and reproduces the player's speech using a voice appropriate to the player's character. Typically, the voice will have been chosen by the player from an appropriate selection offered by the game during the character creation phase.

Since each player will individually log in to play the game, a user-specific speaker profile can be established and used to improve the effectiveness of the speech recognition, enabling a wider vocabulary to be used. As part of the player's registration process, a player is asked to provide some simple speech samples of known text, enabling a speech profile to be established. In addition, players may be provided with a facility that allows them to further coach the system with additional words, including names of other characters.

The speech output from the IVR process can be used as the player's voice in a number of ways.

A private dialogue between two players. This requires the modified voice to be delivered to the other player's computer or gaming console.

A closed dialogue between several players. This requires either a dedicated conference facility or a mixing facility on each player's PC able to combine multiple voice streams.

An open dialogue between all players in a locale. Since each player should only hear the voices of other characters close to them and this will often be a unique combination for every player, it is necessary to provide a dedicated voice stream mixing facility for each player. This can be network-based, but a mixing facility on each PC is likely to offer the best solution. As a further refinement, distant voices can be reduced in volume to deliver a more realistic experience.

The speech can also be reproduced as text to provide confirmation that the speech has been correctly recognised. If errors in recognition do occur the player can use a coaching system to reduce the chances of the same error being repeated.

Similarly, a text to speech facility can be provided to allow the player to type in text and have it spoken by their character.

As a further refinement, a profanity filter can be applied to the speech before it is regenerated as the modified voice, enabling obscene language to be replaced with an alternative such as silence. Unlike profanity filters applied to text messages, it is impossible to bypass a speech filter using creative spelling of words.

The IVR system can also be used to enable players to interact verbally with the game server. The IVR system can identify key words in the player's speech and use these to select an appropriate response by the game server. The use of natural language analysis provides a more fluid dialogue, enhancing the player's experience.

According to a first aspect, the invention provides communication apparatus for an online gaming network comprising a voice input, voice recognition means, voice generation means and voice output means connectable to a voice bridge, the voice recognition means being operable to recognise voice received via the voice input and to generate voice data representative of recognised words, the voice generation means being operable to regenerate voice from the voice data using a predetermined voice type and to pass the regenerated voice to the voice output.

In a second aspect, the invention provides a method of communicating in an online game comprising, receiving speech from a game player, performing speech recognition on the received speech, regenerating the speech using a predetermined speech type and passing the regenerated speech to at least one other player in the online game.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

Figure 1:
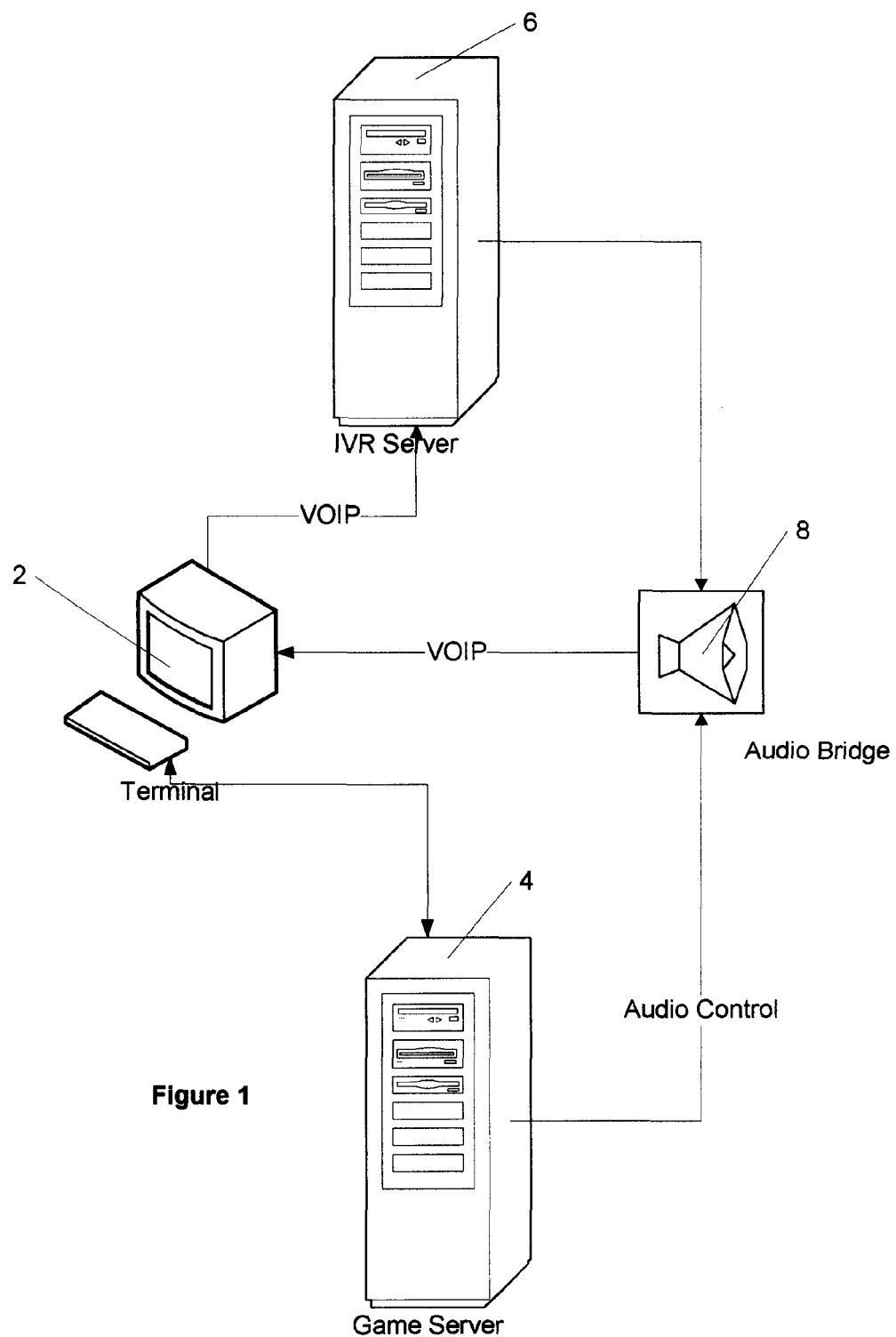
FIG. 1 is a schematic block diagram of a gaming system including apparatus in accordance with the invention.

With reference to FIG. 1, a terminal 2 such as an IBM compatible PC or games console is connected to a game server 4 in the conventional way. Typically this will be a connection via a broadband internet connection. The game server operates to co-ordinate the activities of a plurality of players connected via a plurality of terminals 2 (not shown). Control signals pass between the game server and the terminal. The terminal passes control signals to the game server indicating the activities of the role played by the player and control signals pass back from the game server to the terminal to indicate to the terminal 2 what images to render and sounds to create based on the activities of the players and non-player characters.

In use, voice output from the player is passed to an IVR server 6. This is described in more detail below. The IVR server 6 controls an audio bridge 8 which feeds sound back to the terminal 2. The game server 4 also may control the activity of the audio bridge 8 as described below. The audio bridge 8 may be dedicated to a single player or may operate to provide audio feedback to more than one player.

Figure 2:
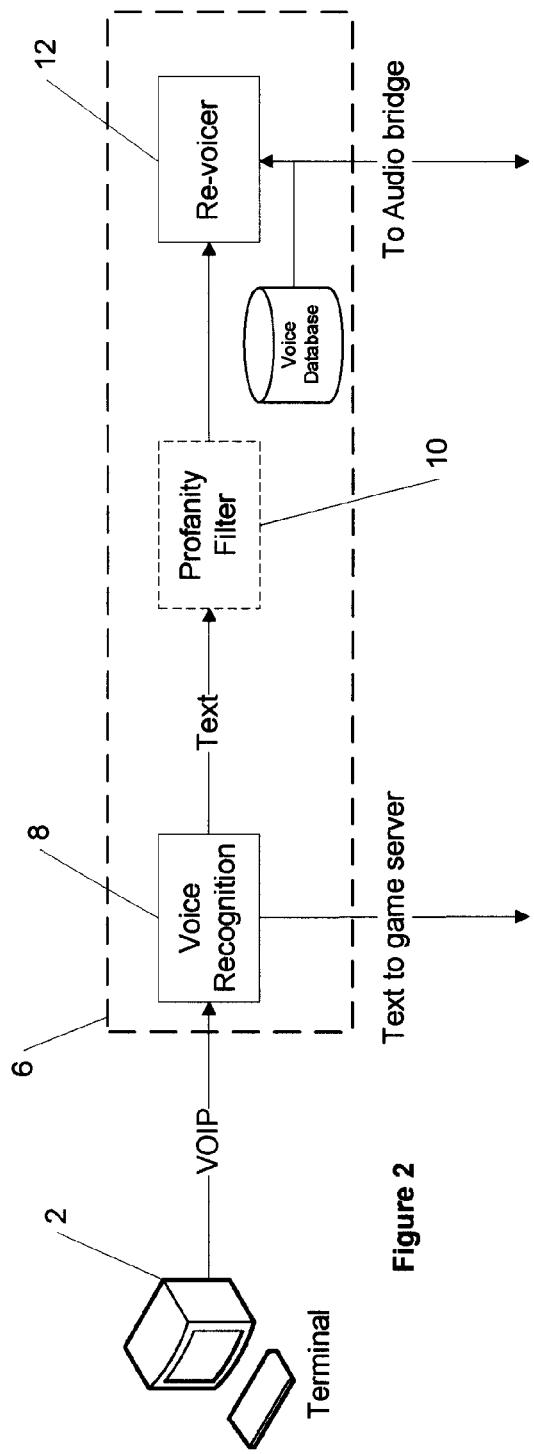
FIG. 2 is a schematic block diagram of an IVR server in accordance with the invention.

With reference also to FIG. 2, the IVR server 6 serves to recognise the voice output of a player operating at terminal 2. A voice recognition unit 8 converts the recognised voice into a normalised internal format such as text. Optionally the internal format may be checked for profanity in a profanity filter 10. The filter may block profane comments and words. A revoicer 12 converts the text back to audible voice data which is then fed to the audio bridge for onward transmission to players. The revoicer voices the players according to characteristics selected by the player and/or game server. Thus the revoiced sounds typically will sound very different to the original sounds produced by the player prior to voice recognition.

Optionally, the internal format produced by the voice recognition unit may also be passed back to the game server. In this way certain aspects of the game may be controlled using voice commands.

Figure 3:
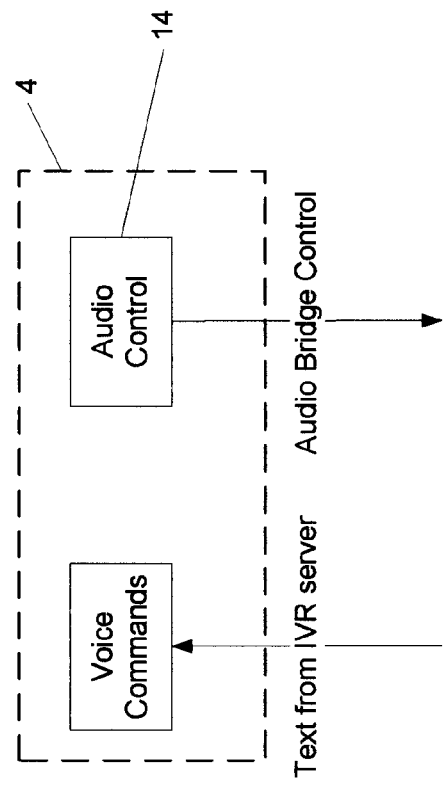
FIG. 3 is a schematic block diagram of a game server in accordance with the invention

With reference to FIG. 3, the game server 4 optionally may control the audio bridge 8. If, for example, a dedicated audio bridge is used for a single player then the game server 4 may accurately control which voices of other players or NPCs may be heard by the player. Also, volume control and other effects such as reverberation and echo may be applied to particular voices depending on the distance and location of the voice in the game, relative to the player. This information is know by the game server and may be processed by audio control unit 14 to provide realistic audio control. Alternatively, an audio bridge may be shared by a group of people for example a group of people located in a particular unit within the game such as a room. In this case, all people in the room may be able to hear one another at the same volume. This simplifies audio control and also reduces the number of bridges required.

Words may be taught to the IVR server 6 via the game client operating on the terminal 2. The game client may include a coaching or training module which allows the player to pronounce particular words which are not initially understood by the IVR server 6.

In this way, the realism of the illusion of the game is maintained by providing voices which match those of a particular player/character. Furthermore, the option of voice control of the game is also provided, improved profanity filtering which cannot be bypassed by unusual spellings or use of characters and furthermore, realistic voice volumes may also be applied. These features greatly enhance the accuracy of the game experience.

What is claimed is:

1. Communication apparatus for an online gaming network comprising a voice input, voice recogniser, voice generator and voice output connectable to a voice bridge, the voice recogniser being operable to recognise voice data received via the voice input and to generate data, other than voice data, representative of recognised words, the voice generator being operable to regenerate voice data from the data using a predetermined voice type and to pass the regenerated voice data to the voice output.

2. Apparatus according to claim 1, further comprising an audio controller operable to adjust the volume of the regenerated speech for a plurality of respective players dependent on at least one known location in the game, of the players relative to one another.

3. Apparatus according to claim 1, further comprising a voice database containing data representative of at least one said predetermined voice type and the voice type being selectable under control of the apparatus dependent on user settings and/or a gamer server operating in the online gaming network.

4. Apparatus according to claim 1 wherein the data comprises text data.

5. A method of communicating in an online game comprising, receiving speech from a game player, performing speech recognition on the received speech, generating data, other than voice data, using a processor representative of recognised words, regenerating the speech from the data using a predetermined speech type and passing the regenerated speech to at least one other player in the online game.

6. A method according to claim 5, further comprising adjusting the volume of the regenerated speech for a plurality of respective players dependent on at least one known location in the game, of the players relative to one another.

7. A method according to claim 5, further comprising selecting the predetermined speech type during game setup.

8. A method according to claim 5, further comprising selecting the predetermined speech type during gameplay.

9. A method according to claim 5, including filtering the recognised speech to block a predetermined set of blocked words by arranging for the speech regeneration step to generate a different word or sound to that recognised in the speech recognition step when a blocked word is recognised.

10. A method according to claim 5 wherein the data comprises text data.

* * * * *